July 17, 1956  D. L. SCHWARTZ  2,754,617
AERATED BAIT PAIL
Filed May 20, 1952
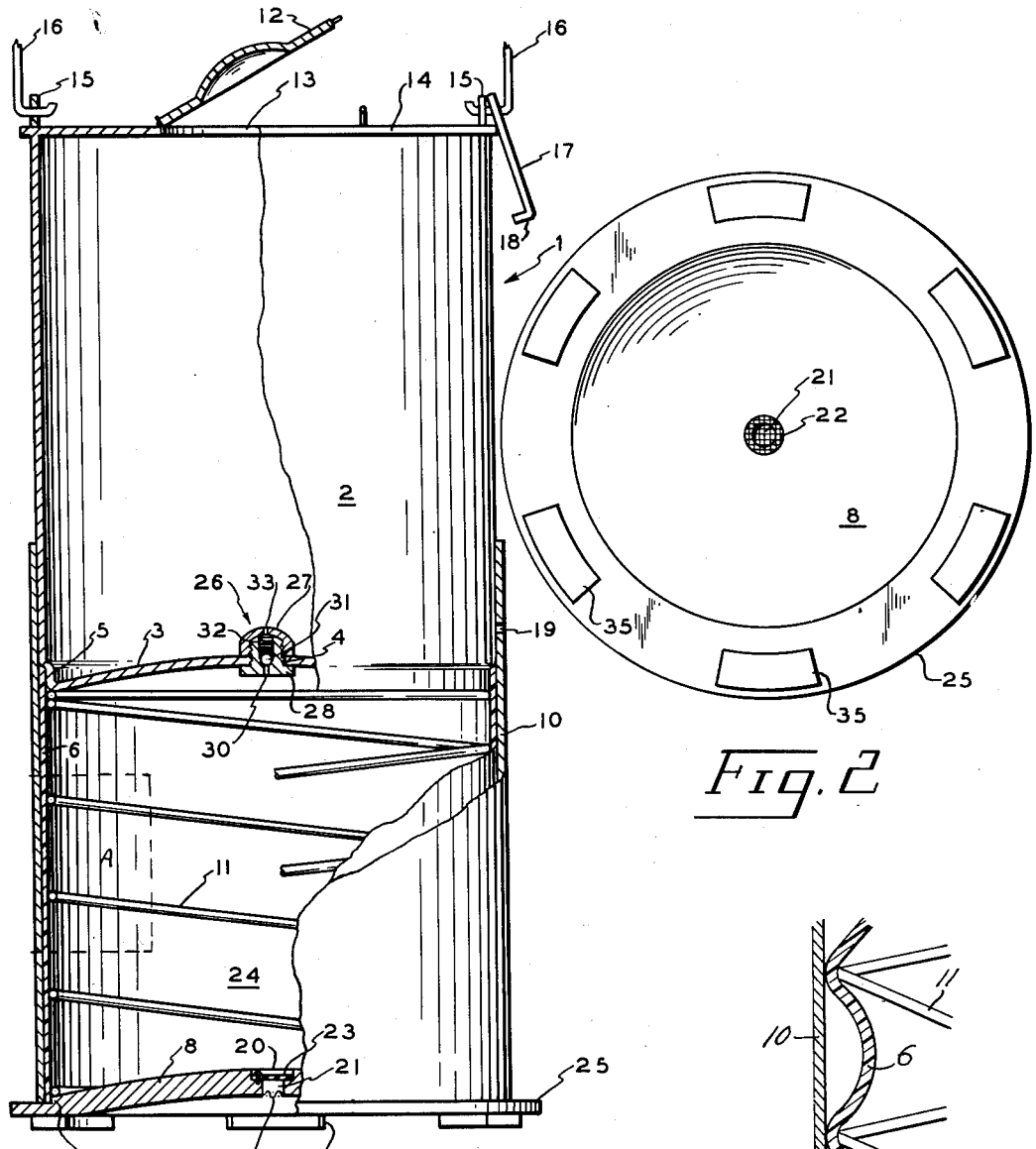
Fig.1
Fig.2
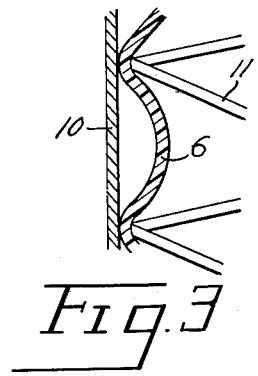
Fig.3
INVENTOR
DAVID H. SCHWARTZ
BY *Hyman Hurwitz*
ATTORNEY

United States Patent Office 2,754,617
Patented July 17, 1956

2,754,617

AERATED BAIT PAIL

David L. Schwartz, Hollywood, Fla.

Application May 20, 1952, Serial No. 288,931

4 Claims. (Cl. 43—57)

The present invention relates generally to a self-contained live bait container and aerator, and more particularly to the provision of a simple, inexpensive device for storing live bait in a water filled container, and for maintaining a constant flow of fresh air through the water, over a long time period, in order to maintain the bait alive and healthy.

It is a prime object of the present invention to provide a novel unitary live bait container and aerator.

It is a further object of the invention to provide a unitary live bait container and aerator which may be charged with air from the atmosphere by a simple rapid manual operation, and which thereafter will supply the charged air to a volume of water, very slowly, and over a long time period, by continuing aerating operation.

It is a further object of the invention to provide a device of the type indicated which shall continuously indicate the progress of the aerating operation.

Another object of the invention resides in the provision of a live bait container and aerator which may be fabricated of simple parts, few in number, to the ends that economy of original fabrication may be attained, and maintenance may be reduced to a minimum.

Still another object of the invention resides in the provision of a superposed water container, and a supporting air container, in which air may readily be stored under pressure in response to a single downward thrust of the water container, a one way valve being provided intermediate the two containers to admit air into the water container from the air container in response to the weight of the water.

The above and still further objects, features and advantages of the invention will become apparent upon consideration of the following specific description of a specific embodiment thereof, especially when taken in conjunction with the accompanying drawings, wherein:

Figure 1 is a view in longitudinal section through a structure in accordance with the invention;

Figure 2 is a bottom view of the structure of Figure 1; and

Figure 3 is an enlarged view of the area A of Figure 1 showing the container in a partially collapsed position.

Referring now more specifically to the drawings, the reference numeral 1 denotes a live bait container, arranged to hold water in adequate quantity to maintain a considerable number of minnows, or the like, in lively condition, if adequately aerated. It is well known that in the absence of such aeration the minnows die or become very sluggish, and are not then suitable for bait. At the same time it is frequently necessary to keep a live bait container aerated over a period of many hours, and preferably without attention, or with slight attention.

Many forms of live bait aerators have been devised. Most of them have the defects either of considerable first cost, or of complexity of operation, or of requiring frequent attention.

In accordance with my invention, the main part of container 1, i. e., cylinder 2, may be fabricated of metal or plastic by simple machining operation. The bottom wall 3 of the container 1 may be dished inwardly, as an optional matter, and provided with a central aperture 4. The portion 5 of the cylinder 2 adjacent the bottom wall 3 may be made of slightly reduced diameter.

The portion 5 of reduced diameter may be cemented to one open end of a sleeve 6, fabricated of flexible material which is impervious to air, such as plastic sheet. A wide variety of suitable materials of this nature is readily available and widely known, so that no specific material is referred to herein.

An annular base plate 8 is provided, having an outer rim perhaps several inches greater than the diameter of the sleeve 6, and which may be slightly dished, as illustrated. An annular shoulder 9 is provided extending from the upper surface of the base member 8, and having a diameter equal to the inner diameter of the sleeve 6. The lower end of the sleeve 6 is then cemented about the annular shoulder 9.

The reduction of diameter of the cylinder 2 at the portion 5 which is of reduced diameter is such that the cylinder 2, and the sleeve 6 may have equal diameters, the sleeve 6 then providing a flexible extension of the cylinder 2, divided transversely by the bottom wall 3 of the container 1.

A stiff cylinder 10 surrounds the entire sleeve 6, and the lower portion of the cylinder 1, and in sliding relation to the latter, and is secured to the sleeve 6 at or adjacent to its lower edge by a suitable adhesive, for example cement.

I provide a weak helical spring 11, internally of the sleeve 6, and with an external diameter substantially equal to or slightly less than that of the sleeve 6, to avoid frictional resistance and wear on the sleeve 6. The helical spring 11 rests on the base plate 8 and presses against the under side of the bottom wall 3, and tends, without succeeding, to overcome the weight of the container 1, when filled or partially filled with liquid.

A hinged closure 12 is provided for an opening 13 in the upper wall 14 of the container 1, and ears 15 may be secured to the upper wall 14, or in some other convenient adjacent position, to which may be looped a carrying bail 16, of conventional character.

Since, when the container 1 is empty, the spring 11 will force the container 1 to its uppermost position, thereby consuming an unnecessarily large volume, I provide a hook 17, preferably looped about bail 16, and which has an inwardly extending finger 18, for engagement with a small aperture 19, provided in the wall of the stiff cylinder 10. In order to engage the finger 18 with the aperture 19, the container 1 is sufficiently depressed, against the expansive force of the helical spring 11. When engaged, the expansion force of the spring 11 locks the finger 18 in the aperture 19, by providing considerable frictional resistance to its removal.

Located axially in the upper wall of annular base plate 8 is a slight depression 20, followed by an aperture 21. A screen filter 22 is cemented or otherwise secured to the under side of the aperture 21, and a flap valve 23, opening inwardly, is secured at one edge within the depression 20, so as to form a one way inlet valve, for the entrance of air via aperture 21 to within the boundaries of the container 24 formed by sleeve 6, upper wall 3, and base member 8.

To fill the container 24, an operator may hold the annular outward extension 25 of the base plate 8 with his feet, pulling upwardly on the container 1, as by means of bail 16. The upward motion of wall 3 tends to reduce the air pressure internally of container 24, resulting in opening of the flap valve 23, and a consequent flow of air into the container 24. Once the upward movement of the wall 3 ceases, so that no further expansion of the volume of container 24 takes place, the flap valve 23 closes, trapping the air, and preventing its return via aperture 21 when pressure is exerted downwardly on wall 3.

A ball valve 26 is secured in the aperture 4 in wall 3. The valve 26 may be fabricated generally of two threadedly engaging members, 27 and 28, which clamp the wall 3 when threadedly engaged.

The lower member 28, is provided with a small axial aperture 30, on the opening of which rests a ball 31, larger in diameter than the aperture 30, to close the latter. The ball 31 is pressed to close the axial aperture 30 by a superposed helical spring 32, and the spring 32 and ball 31 rest within an axial recess in lower member 28, which forms an upward extension of axial aperture 30, and is of larger diameter than the latter. The upper member 27, forms an inwardly threaded cap for an outwardly threaded portion of lower member 28, extending above the wall 3. The upper member, 27, is provided with an axial aperture 33, completing an air passage between the container 1 and the container 24, except for the presence of the ball 31.

Accordingly, when the container 1 is filled with water, or otherwise subjected to downward force, sufficient to overcome the expansive force of the spring 11, the increased pressure of air within the container 24 provides a differential of pressure as between the upper and under surfaces of wall 3, resulting in a net upward force on ball 31.

The spring 32 is relatively weak, so that in fact the weight of a normal quantity of water within container 2 is sufficient to raise the ball 31 slightly, thereby permitting air to leak into the water in container 2. The container 2 cannot descend rapidly, since to do so would cause buildup of air pressure in container 24, which tends to prevent such descent. Descent is accordingly accomplished at a rate determined primarily by the rate of air leakage past valve 26, and this rate may be made extremely small. At the same time water cannot leak down past valve 26, because the pressure internally of container 24 is greater than the pressure of the water above.

In operation, then, the extension 25 of the base member 8 is held, as with the feet, and the upper container 1 raised, to charge the lower container with air. The upper chamber is then filled with water, and live bait inserted in the water, via opening 13. The latter may then be closed, and will provide necessary air leakage facility from above the water, inherently.

The weight of the water in container 1, and the weight of the container, are greater than the force of spring 11, and container 1 tends to descend thereby causing the flexible sleeve 6 to progressively collapse into accordion folds between the coils of the spring 11 and assume the configuration illustrated in Figure 3. The portion of the container illustrated in Figure 3 is defined by the area A of Figure 1 enclosed within the dashed line. Any small descent is accompanied by air leakage past valve 26, which aerates the water, and permits further descent. This process can be caused to continue for many hours, in a single operation, and the status of completion of each process can readily be determined by simple visual inspection of the physical relation of the containers 1 and 24. As required the container 24 can be refilled with air.

In order to facilitate the recharge process, and to assure that air will always be freely available to aperture 21, the base 8 may be offset from its rest surface by means of a plurality of laterally separated pedestals, as 35.

While I have described and illustrated one specific example of the present invention it will be clear that variations of the specific details of construction may be resorted to without departing from the true spirit of the invention as defined in the appended claims.

What I claim is:

1. An aerator for a liquid container comprising an air container having a rigid base wall, a rigid top wall, and an expandable and contractable hollow sleeve secured between said base and top walls, in substantially air tight relation to said walls, a normally closed valve for admitting air to said air container upon expansion of said hollow sleeve, a water container, the base of said water container being the top wall of said air container, a normally closed valve in said top wall of said air container for admitting air to said water container upon contraction of said hollow sleeve, a rigid sleeve secured to said base wall of said air container for guiding said water container throughout its entire allowable vertical movement, said rigid sleeve being disposed about said flexible sleeve, and a compression spring disposed between said bottom wall and said top wall of said air container for resisting downward movement of said water container, said spring being calibrated so that the weight of the water in the water container causes said spring to be gradually compressed.

2. The combination in accordance with claim 1 wherein said rigid sleeve, said hollow flexible sleeve, and said water container are cylindrical.

3. An aerator for a predetermined quantity of water comprising an air container having a rigid base wall, a rigid top wall, and an expansible and contractible hollow sleeve secured between said base and top walls, in substantially air tight relation to said walls, a normally closed valve for admitting air to said air container upon expansion of said hollow sleeve, a water container for said water, the base of said water container being the top wall of said air container, a normally closed valve in said top wall of said air container for admitting air to said water container upon contraction of said hollow sleeve, and a rigid sleeve secured to said base wall of said air container for guiding said water container throughout its entire allowable vertical movement, said rigid sleeve being disposed about said flexible sleeve, said latter normally closed valve being calibrated with respect to the predetermined weight of water in said water container to provide a predetermined flow of air through said latter valve over a predetermined length of time.

4. An aerator for a predetermined quantity of water comprising an air container having a rigid base wall, a rigid top wall, and an expansible and contractible hollow sleeve secured between said base and top walls, in substantially air tight relation to said walls, a normally closed valve for admitting air to said air container upon expansion of said hollow sleeve, a water container, the base of said water container being the top wall of said air container, a normally closed valve in said top wall of said air container for admitting air to said water container upon contraction of said hollow sleeve, a rigid sleeve secured to said base wall of said air container for guiding said water container throughout its entire allowable vertical movement, said rigid sleeve being disposed about said flexible sleeve, and a compression spring disposed between said bottom wall and said top wall of said air container, said compression spring exerting an upward force to partially offset the weight of said water and to establish a predetermined residual downward force, said latter valve being calibrated with respect to the residual downward force to provide a predetermined flow of air through said valve over a predetermined time in response to said residual downward force.

References Cited in the file of this patent

UNITED STATES PATENTS

| | | |
|---|---|---|
| 53,609 | Hainsworth | Apr. 3, 1866 |
| 724,539 | Bourne | Apr. 7, 1903 |
| 750,143 | Wilson et al. | Jan. 19, 1904 |
| 2,639,200 | Hennessy | May 19, 1953 |

FOREIGN PATENTS

| | | |
|---|---|---|
| 562,190 | Great Britain | June 21, 1944 |